(12) United States Patent
Rush et al.

(10) Patent No.: US 7,155,549 B2
(45) Date of Patent: Dec. 26, 2006

(54) VMEBUS SPLIT-READ TRANSACTION

(76) Inventors: Malcolm J. Rush, 6839 N. 12th Way, Phoenix, AZ (US) 85014; Jeffrey M. Harris, 1528 E. Kaibab Dr., Chandler, AZ (US) 85249

( * ) Notice: Subject to any disclaimer, the term of this patent is extended or adjusted under 35 U.S.C. 154(b) by 276 days.

(21) Appl. No.: 10/899,651

(22) Filed: Jul. 26, 2004

(65) Prior Publication Data

US 2006/0020727 A1  Jan. 26, 2006

(51) Int. Cl.
*G06F 13/42* (2006.01)
(52) U.S. Cl. .................. 710/110; 710/106; 711/167; 709/232
(58) Field of Classification Search .............. 710/5, 710/105, 240, 306; 709/217; 711/105
See application file for complete search history.

(56) References Cited

U.S. PATENT DOCUMENTS

| 5,721,828 | A  | * | 2/1998  | Frisch ........................... 709/217 |
| 5,890,197 | A  | * | 3/1999  | Nagasaka ..................... 711/105 |
| 6,820,140 | B1 | * | 11/2004 | Bissessur et al. ............... 710/5 |
| 6,948,019 | B1 | * | 9/2005  | Stuber et al. ................ 710/240 |
| 6,996,643 | B1 | * | 2/2006  | Wolfe et al. ................. 710/105 |
| 2005/0246474 | A1 | * | 11/2005 | Wolfe et al. ................ 710/306 |

* cited by examiner

*Primary Examiner*—Christopher E. Lee
(74) *Attorney, Agent, or Firm*—Kevin D. Wills

(57) ABSTRACT

A method of performing a VMEbus split-read transaction (401) includes providing a master VMEbus module (102) coupled to a slave VMEbus module (104) through a VMEbus network (106). The master VMEbus module initiates a VMEbus split-read transaction request (124) in a VME address encoding phase (201) to the slave VMEbus module, where the VMEbus split-read transaction request includes a tag identifier (206, 306) in the VMEbus address encoding phase corresponding to the VMEbus split-read transaction request, where the tag identifier is unique to the VMEbus split-read transaction request, and where the VMEbus split-read transaction request requests a set of data (144). The master VMEbus module releases the VMEbus network and the slave VMEbus module acquires the VMEbus network. The slave VMEbus module places the set of data on the VMEbus network, wherein the set of data includes the tag identifier. The master VMEbus module correlates the tag identifier to the split-transaction request and the master VMEbus module retrieves the set of data.

21 Claims, 6 Drawing Sheets

FIG. 2

200  VME ADDRESS PHASE ENCODING TABLE

| | 206 | 208 | 210 | | 204 |
|---|---|---|---|---|---|
| | | | | | 212 |
| 220 — ADDRESS PHASE ONE | DEVICE ADDRESS | DEVICE ADDRESS | DEVICE ADDRESS | DEVICE ADDRESS | SPLIT-READ TRANSACTION CODE |
| 230 — ADDRESS PHASE TWO | TAG IDENTIFIER | SUBUNIT | GEOGRAPHIC ADDRESS | BEAT COUNT | DEVICE ADDRESS |
| 240 — ADDRESS PHASE THREE | RESERVED | RESERVED | RESERVED | RESERVED | RESERVED |
| 250 — DATA PHASE | DATA | DATA | DATA | DATA | DATA |

201 brackets 220, 230, 240

| TAG IDENTIFIER | MASTER VMEBUS MEMORY ADDRESS DESTINATION |
|---|---|
| 0 | MEMORY SPACE 1 |
| 1 | MEMORY SPACE 2 |
| ... | ... |

306          320

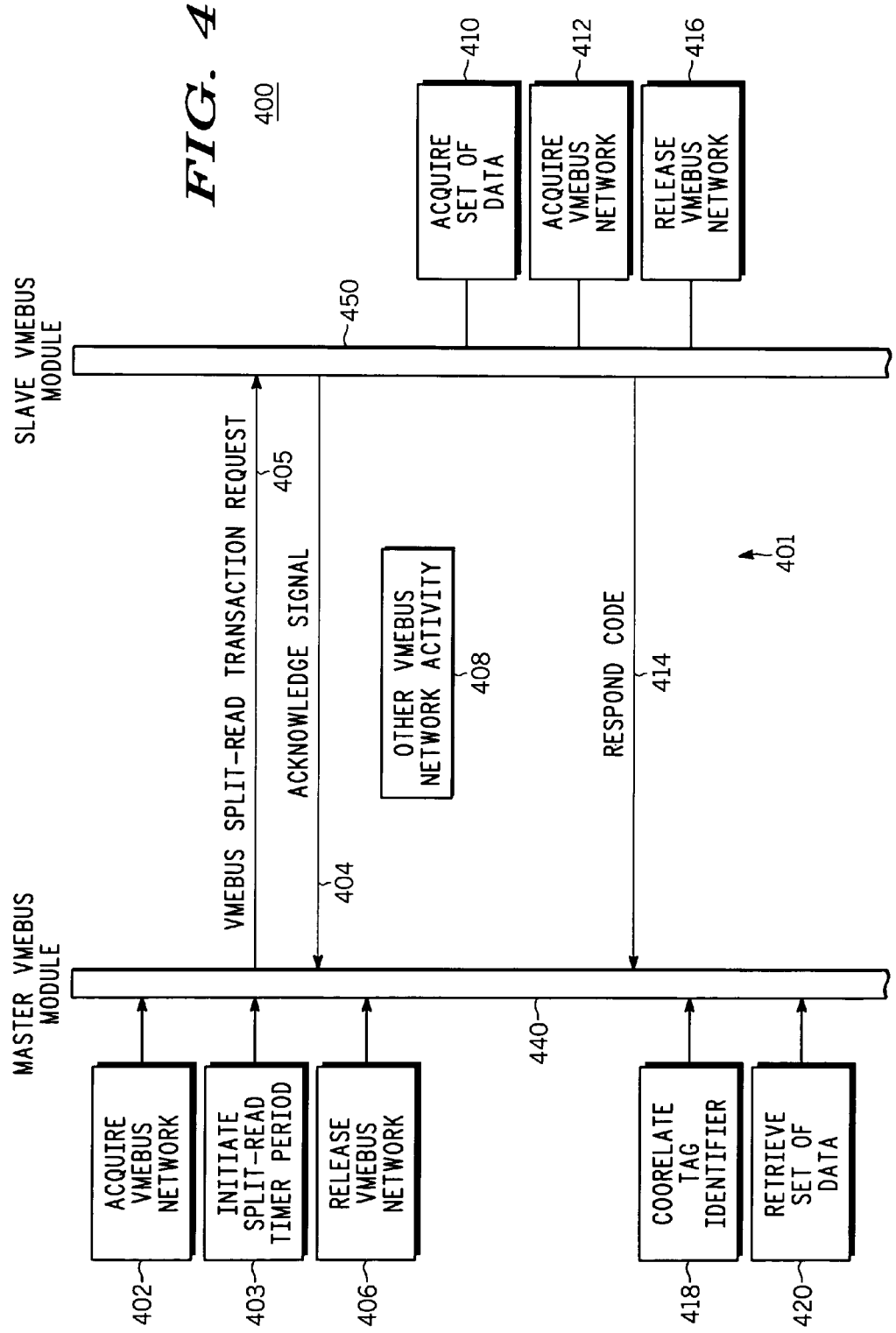

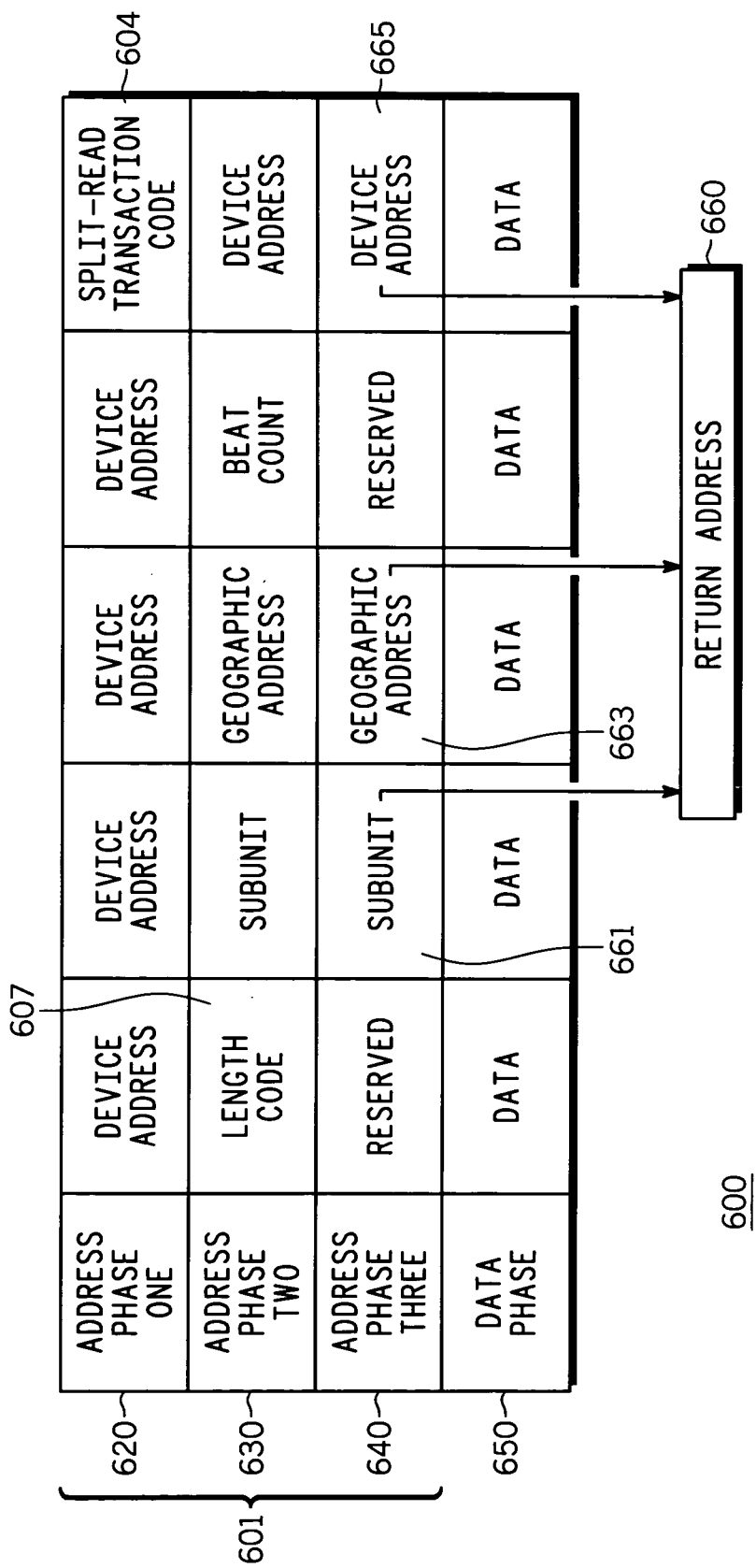

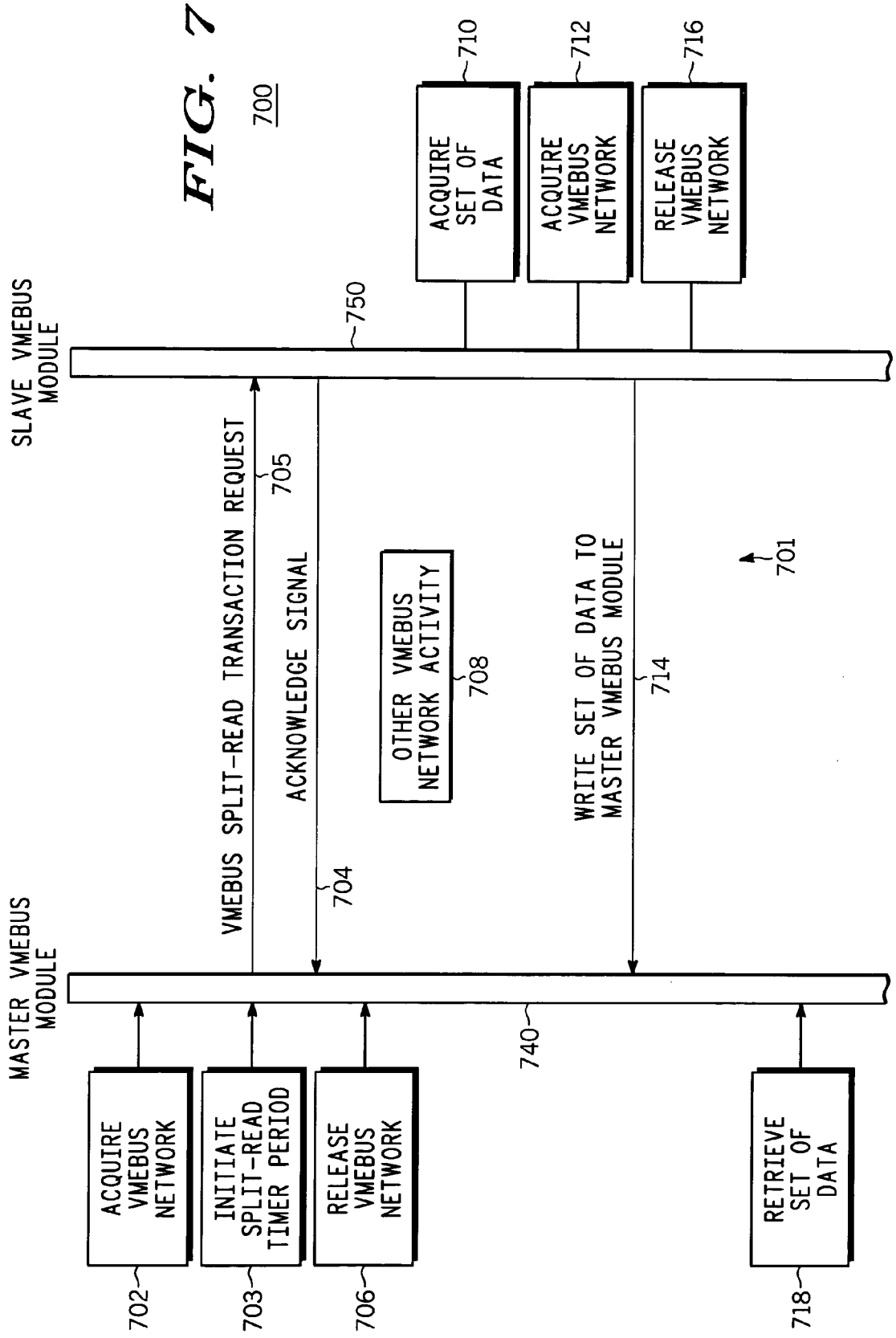

VMEBUS SPLIT-READ TRANSACTION

RELATED APPLICATIONS

Related subject matter is disclosed in U.S. patent application entitled "METHOD OF VMEBUS SPLIT-READ TRANSACTION" having application Ser. No. 10/899,611 and filed on the same date herewith and assigned to the same assignee.

BACKGROUND OF THE INVENTION

In current high-speed data networks, such as multi-service platform systems using VERSAmodule Eurocard (VMEbus) protocols, a read request ties up the VMEbus network for the entire duration of the transaction. In the prior art, there are two halves to a read transaction. In the first half, a module requests data from another module. In the second half, the requested data is transmitted over the VMEbus network. In the prior art, there may be a significant time spent retrieving the requested data between the request and the actual transmission of the data. The prior art has the VMEbus being suspended while the data retrieval is occurring. This has the disadvantage of idle time between the first and second halves of the transaction, which negatively affects system performance as no other transactions can take place on the VMEbus network.

Accordingly, there is a significant need for an apparatus and method that overcomes the deficiencies of the prior art outlined above.

BRIEF SUMMARY OF THE INVENTION

The invention pertains to a split-read transactions on a VMEbus. A master VMEbus module is coupled to a slave VMEbus module via a VMEbus network. The master VMEbus module acquires the VMEbus network and initiates a split-read transaction request to the slave VMEbus module. The master VMEbus module releases the VMEbus network, and the slave VMEbus module acquires the VMEbus network and transfers the set of requested data to the master VMEbus module. The slave VMEbus module then releases the VMEbus network.

BRIEF DESCRIPTION OF THE DRAWINGS

Referring to the drawing:

FIG. 2 depicts a VME address phase encoding table according to an embodiment of the invention;

FIG. 3 depicts a tag identifier table according to an embodiment of the invention;

FIG. 4 depicts a ladder diagram illustrating an embodiment of the invention;

FIG. 6 depicts a VME address phase encoding table according to another embodiment, of the invention; and FIG. 7 depicts a ladder diagram illustrating another embodiment of the invention.

Figure 1:
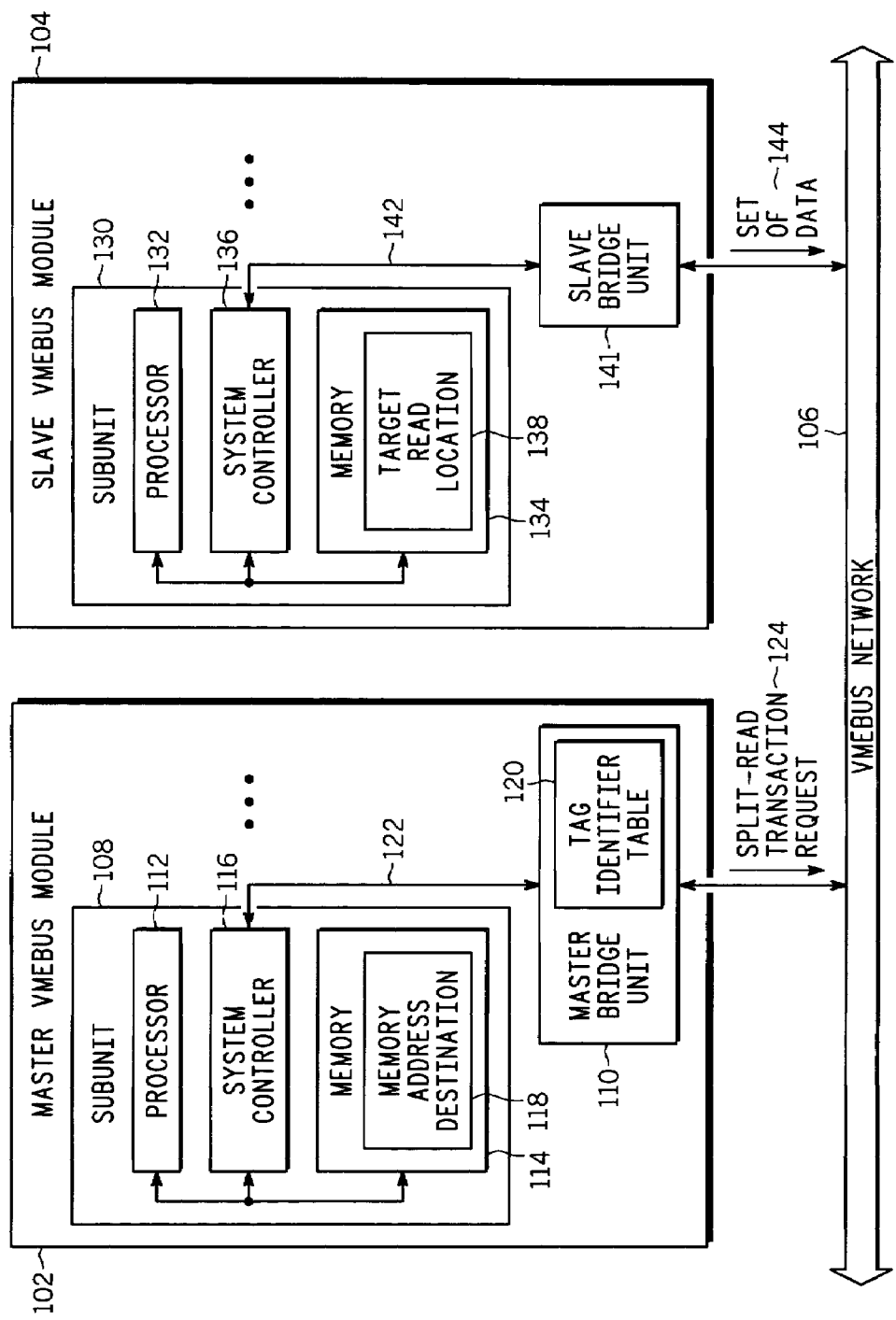
FIG. 1 depicts a multi-service platform system according to an embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

In the following detailed description of exemplary embodiments of the invention, reference is made to the accompanying drawings, which illustrate specific exemplary embodiments in which the invention may be practiced. These embodiments are described in sufficient detail to enable those skilled in the art to practice the invention, but other embodiments may be utilized and logical, mechanical, electrical and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

For clarity of explanation, the embodiments of the present invention are presented, in part, as comprising individual functional blocks. The functions represented by these blocks may be provided through the use of either shared or dedicated hardware, including, but not limited to, hardware capable of executing software. The present invention is not limited to implementation by any particular set of elements, and the description herein is merely representational of one embodiment.

FIG. 1 depicts a multi-service platform system 100 according to an embodiment of the invention. Multi-service platform system 100 can include an embedded-type computer chassis (as opposed to an enterprise based chassis), with software and any number of slots for inserting modules. In a particular embodiment, multi-service platform system 100 can include a VERSAmodule Eurocard (VME) chassis and slots for inserting VME compatible modules. VME modules can add functionality to multi-service platform system 100 through the addition of processors, memory, storage devices, and the like. A backplane can be used for connecting VME modules placed in the slots of multi-service platform system 100.

Multi-service platform system 100 can include any number of VME modules coupled to VMEbus network 106. VMEbus network 106 can include hardware and software necessary to implement a data network using VMEbus parallel multi-drop protocols. An example of a parallel multi-drop topology is a VERSAmodule Eurocard (VMEbus) system using any of the VMEbus protocols known in the art. VMEbus is defined in the ANSI/VITA 1-1994 and ANSI/VITA 1.1-1997 standards, promulgated by the VMEbus International Trade Association (VITA), P.O. Box 19658, Fountain Hills, Ariz., 85269 (where ANSI stands for American National Standards Institute). In an embodiment of the invention, VMEbus based protocols can include, but are not limited to, Single Cycle Transfer protocol (SCT), Block Transfer protocol (BLT), Multiplexed Block Transfer protocol (MBLT), Two Edge VMEbus protocol (2 eVME) and Two Edge Source Synchronous Transfer protocol (2eSST). These VMEbus protocols are known in the art.

As shown in FIG. 1, multi-service platform system 100 can include master VMEbus module 102 and slave VMEbus module 104. In an embodiment, VMEbus network 106 couples master VMEbus module 102 and slave VMEbus module 104. Other VMEbus modules can be included in multi-service platform system 100 and be within the scope of the invention.

Master VMEbus module 102 can include a subunit 108, where subunit includes processor 112 and memory 114. Memory 114 can comprise control algorithms, and can include, but is not limited to, random access memory (RAM), read only memory (ROM), flash memory, electrically erasable programmable ROM (EEPROM), and the like. Memory 114 can contain stored instructions, tables, data, and the like, to be utilized by processor 112. In an embodiment, subunit 108 can also include system controller 116 for controlling one or more subunits, processors, and the like, on master VMEbus module 102. System controller 116 can be a part of subunit 108 or be independent of subunit 108 and control other subunits as well. In another embodiment, master VMEbus module 102 can include more than one subunit, where other subunits can have any combination of processors, memory, and the like. In another embodiment, subunit 108 can include other elements such as data storage units (disk drives), and the like.

In an embodiment, master VMEbus module 102 can also include master VMEbus module bridge unit 110, which can be hardware and/or software to provide an interface between subunit 108 on master VMEbus module 102 and VMEbus network 106. Each subunit 108 is coupled to communicate with master VMEbus module bridge unit 110. In addition, master VMEbus module bridge unit 110 is coupled to communicate with VMEbus network 106.

In an embodiment, subunits are coupled to master VMEbus module bridge unit 110 and can communicate with master VMEbus module bridge unit 110 through a parallel multi-drop network 122, which can use for example, a Peripheral Component Interconnect-X (PCI-X) based protocol. In an embodiment of the invention, PCI-X based protocols can include both PCI and PCI-X2 protocols. Master VMEbus module bridge unit 110 is capable of communicating with subunit 108 using any variant of the PCI-X based protocol. Examples of variants of PCI-X protocols, without limitation, include 133 MHz 64-bit PCI-X, 100 MHz 64-bit PCI-X down to 66 MHz 32-bit PCI-X, and the like. Master VMEbus module bridge unit 110 can also communicate with subunit 108 using any variant of older PCI based protocols (a subset of PCI-X based protocols), for example and without limitation, 66 MHz 64-bit PCI down to 33 MHz 32-bit PCI, and the like.

Master VMEbus module bridge unit 110 allows master VMEbus module 102 to communicate with slave VMEbus module 104 via VMEbus network 106 using any of VMEbus based protocols cited above. In effect, master VMEbus module bridge unit 110 bridges data commands, requests, and the like, between the PCI based protocols and the VMEbus protocols.

As shown in FIG. 1, multi-service platform system 100 can include slave VMEbus module 104, which can include subunit 130 and slave VMEbus module bridge unit 141 similar to master VMEbus module 102. For example, subunit 130 can include processor 132, memory 134 and system controller 136. Subunit 130 can be coupled to slave VMEbus module bridge unit 141 and communicate using PCI or PCI-X protocols as discussed above. Slave VMEbus module bridge unit 141 can communicate with VMEbus network 106 using any of the VMEbus protocols discussed above. Slave VMEbus module 104 can include any number of subunits and be within the scope of the invention.

In an embodiment, master VMEbus module 102 can request set of data 144 from slave VMEbus module 104. Set of data 144 can include any type of electronic data that is accessible by slave VMEbus module 104. In an embodiment, master VMEbus module 102 can request set of data by issuing a VMEbus split-read transaction request 124 to slave VMEbus module 104. VMEbus split-read transaction request 124 can include a tag identifier taken from tag identifier table 120 in master VMEbus module bridge unit 110. Tag identifier matches VMEbus split-read transaction request 124 to master VMEbus module memory address destination 118 in memory 114 where set of data 144 requested is to be written. The use of tag identifier table 120 is explained more fully below with reference to FIG. 2 and FIG. 3.

Upon recognition of VMEbus split-read transaction request 124, slave VMEbus module 104 can acknowledge the VMEbus split-read transaction request 124. Thereafter, master VMEbus module 102 can release VMEbus network 106 while slave VMEbus module 104 retrieves set of data 144 from a target read location 138 in memory 134. Target read location 138 can be an address space in memory 134. In another embodiment, target read location 138 can be in an external memory source, such as a disk drive, and the like, that is accessible by slave VMEbus module 104. Master VMEbus module 102 releasing VMEbus network 106 after VMEbus split-read transaction request 124 is acknowledged frees up VMEbus network 106 for use in other VMEbus transactions by the same or different VMEbus modules in the interim until slave VMEbus module 104 acquires VMEbus network 106 to return set of data 144.

Upon retrieving set of data 144, slave VMEbus module 104 can acquire control over the VMEbus network 106 and place set of data 144 on VMEbus network 106. Set of data 144 includes tag identifier so master VMEbus module 102 can correlate set of data 144 with master VMEbus module memory address destination 118 and write set of data 144 to master VMEbus module memory address destination 118.

FIG. 2 depicts a VME address phase encoding table 200 according to an embodiment of the invention. VMEbus data transfers have two phases, a VME address encoding phase 201 and a data phase 250. In an embodiment, master VMEbus module 102 initiates the data transfer by either performing a write function and writing data to a slave VMEbus module 104 or requesting data from slave VMEbus module 104 through a read request. In an embodiment, read request can be a VMEbus split-read transaction request 124.

In VME address encoding phase 201, the target VMEbus module's address is indicated. The VMEbus protocol to be used and the transfer speed can also be indicated. In an embodiment, the target VMEbus module can be slave VMEbus module 104. As shown in FIG. 2, VME address encoding phase 201 includes three address phases. The three address phases are: address phase one 220, address phase two 230 and address phase three 240. Initiating a VMEbus split-read transaction request 124 can include transmitting all three address phases.

In an embodiment, address phase one 220 can include split-read transaction code 204 to indicate to slave VMEbus module 104 that master VMEbus module 102 is initiating a VMEbus split-read transaction request 124. In an embodiment, split-read transaction code 204 can be a first extended address modifier (XAM) code. XAM in general is known in the art. Numerous codes within XAM are currently not in use in the VMEbus standard cited above. Any of these non-used XAM codes may be selected to indicate VMEbus split-read transaction request 124.

XAM code used to indicate VMEbus split-read transaction request 124 can be fixed but otherwise arbitrary. In an embodiment, first XAM code is known to both master VMEbus module 102 and slave VMEbus module 104. In a preferred embodiment, first XAM code has a default value that is changeable through a register in a chip on VME modules. In another embodiment, first XAM code indicating VMEbus split-read transaction request 124 can be fixed in a standard.

If slave VMEbus module 104 recognizes split-read transaction code 204, slave VMEbus module 104 will return an acknowledge signal to master VMEbus module 102. In an embodiment, slave VMEbus module 104 returning an acknowledge signal means that slave VMEbus module 104 is capable of performing a VMEbus split-read transaction. If an acknowledge signal is not returned to master VMEbus module 102 prior to expiration of a split-read time period, VMEbus split-read transaction request 124 expires. Failing to acknowledge VMEbus split-read transaction request 124 can mean that slave VMEbus module 104 does not recognize split-read transaction code 204 or that slave VMEbus module 104 is not capable of performing a VMEbus split-read transaction. In an embodiment, other possible responses to VMEbus split-read transaction request 124 can include the immediate sending of requested data 144 (in which case there would be no need for a VMEbus split-read transaction to take place) or a retry signal for master VMEbus module 102 to try again later.

In an embodiment, VME address encoding phase 201 can include the geographic address 210 of master VMEbus module 102, which can be the slot number where master VMEbus module 102 is located within multi-service platform system 100. This indicates where the VMEbus split-read transaction request 124 is coming from. VME address encoding phase 201 can also include the subunit number 208 that contains memory where set of data is to be written. Also included can be device address 212, which indicates the memory address space where target read location 138 is located in slave VMEbus module 104.

In an embodiment, tag identifier 206 is included in address phase two of VME address encoding phase 201. Tag identifier 206 can be an alphanumeric character sequence correlated to master VMEbus module memory address destination 118 in memory 114 of master VMEbus module 102 where set of data 144 is to be written. In an embodiment, device address 212, geographic address 210, subunit number 208 and tag identifier 206 are all included as a respond code with set of data 144. In an embodiment, respond code can be a second XAM code. Master VMEbus module 102 can detect respond code on VMEbus network 106. This can include detecting geographic address 210 of master VMEbus module 102, subunit number 208 on master VMEbus module 102 and tag identifier 206, where tag identifier 206 is correlated to master VMEbus module memory address destination 118. Recognizing these parameters in respond code, master VMEbus module 102 realizes that set of data 144 corresponds to VMEbus split-read transaction request 124 and writes set of data to master VMEbus module memory address destination 118.

FIG. 3 depicts a tag identifier table 320 according to an embodiment of the invention. In an embodiment, tag identifier table 320 can be included in a memory on master VMEbus module bridge unit 110. Tag identifier 306 is assigned to master VMEbus module memory address destination 318 corresponding to VMEbus split-read transaction request 124. Tag identifier 306 can be assigned to master VMEbus module memory address destination 318 when VMEbus split-read transaction request 124 is initiated by master VMEbus module 102. In an embodiment, tag identifier 306 can be an alphanumeric character sequence.

FIG. 4 depicts a ladder diagram 400 illustrating an embodiment of the invention. The process depicted in FIG. 4 illustrates an embodiment of a VMEbus split-read transaction 401. In block 402, master VMEbus module 440 acquires control over VMEbus network 106. VMEbus split-read transaction request 405 is then sent from master VMEbus module 440 to slave VMEbus module 450. VMEbus split-read transaction request 405 requests set of data 144. In an embodiment, VMEbus split-read transaction request 405 is sent in VME address encoding phase 201 and includes tag identifier 206, 306, which corresponds to VMEbus split-read transaction request 405. Tag identifier 206, 306 is unique to VMEbus split-read transaction request 405. In an embodiment, VMEbus split-read transaction request 405 includes split-read transaction code 204, which can be a first XAM code included in address phase one 220 of VME address encoding phase 201.

Upon issuance of VMEbus split-read transaction request 405, split-read timer period 403 is initiated at master VMEbus module 440. If slave VMEbus module 450 recognizes VMEbus split-read transaction request 405 issued by master VMEbus module 440, acknowledge signal 404 is sent over VMEbus network 106 to master VMEbus module 440. If slave VMEbus module 450 fails to issue acknowledge signal 404 prior to expiration of split-read timer period 403, VMEbus split-read transaction request 405 can expire. Slave VMEbus module 450 can fail to respond to VMEbus split-read transaction request 405 because split-read transaction code 204 is not supported or recognized by slave VMEbus module 450. In this instance, slave VMEbus module 450 is not capable of performing VMEbus split-read transactions. In another embodiment, slave VMEbus module 450 can respond immediately by transmitting set of data 144 requested in VMEbus split-read transaction request 405. In this instance, there is no need to perform a VMEbus split-read transaction 401 as there is no delay in acquiring set of data 144.

After master VMEbus module 440 receives acknowledge signal 404, master VMEbus module 440 releases VMEbus network 406. Releasing VMEbus network 406 while slave VMEbus module 450 retrieves set of data 410 allows other VMEbus network activity 408 to take place on VMEbus network 106. Other VMEbus network activity 408 can include any activity not related to the specific VMEbus split-read transaction 401 taking place between master VMEbus module 440 and slave VMEbus module 450. In an embodiment, other VMEbus network activity 408 can include transactions between other modules in multi-service platform system 100. In another embodiment, other VMEbus network activity 408 can include transactions between either master VMEbus module 440 or slave VMEbus module 450 and another module in multi-service platform system 100. In yet another embodiment, other VMEbus network activity 408 can include a different transaction between master VMEbus module 440 and slave VMEbus module 450. Transactions can include write function, read request, another VMEbus split-read transaction request, and the like.

Once slave VMEbus module 450 has acquired the set of data 410, slave VMEbus module 450 can acquire control of VMEbus network 412. Slave VMEbus module 450 can then issue a respond code 414 to master VMEbus module 440, which includes placing the set of data 144 on VMEbus network 106. Respond code 414 can include a VME address encoding phase and data phase analogous to that shown and described in FIG. 2. Respond code 41 can comprise a second XAM code in a VME address phase of the VME address encoding phase. Respond code 414 will include tag identifier 206, 306 in the VME encoding address phase of the VME address phase encoding table, where the tag identifier 206, 306 is the same tag identifier placed in VMEbus split-read transaction request 405. The data phase can include set of data 144 requested by master VMEbus module 440. Optionally, master VMEbus module 440 can acknowledge receipt of respond code 414.

After issuing respond code 414 with set of data 144, slave VMEbus module 450 can then release VMEbus network 416. Master VMEbus module 440 detects respond code 414 and tag identifier 206, 306 and correlates tag identifier to VMEbus split-read transaction request 405 and retrieves 420 set of data 144. In an embodiment, tag identifier 206, 306 can be correlated to master VMEbus module memory address destination 118, 318 in tag identifier table 320 located in master VMEbus module bridge unit 110. In an embodiment, retrieving set of data 420 includes master VMEbus module 440 writing set of data to master VMEbus module memory address destination 118, 318.

Figure 5:
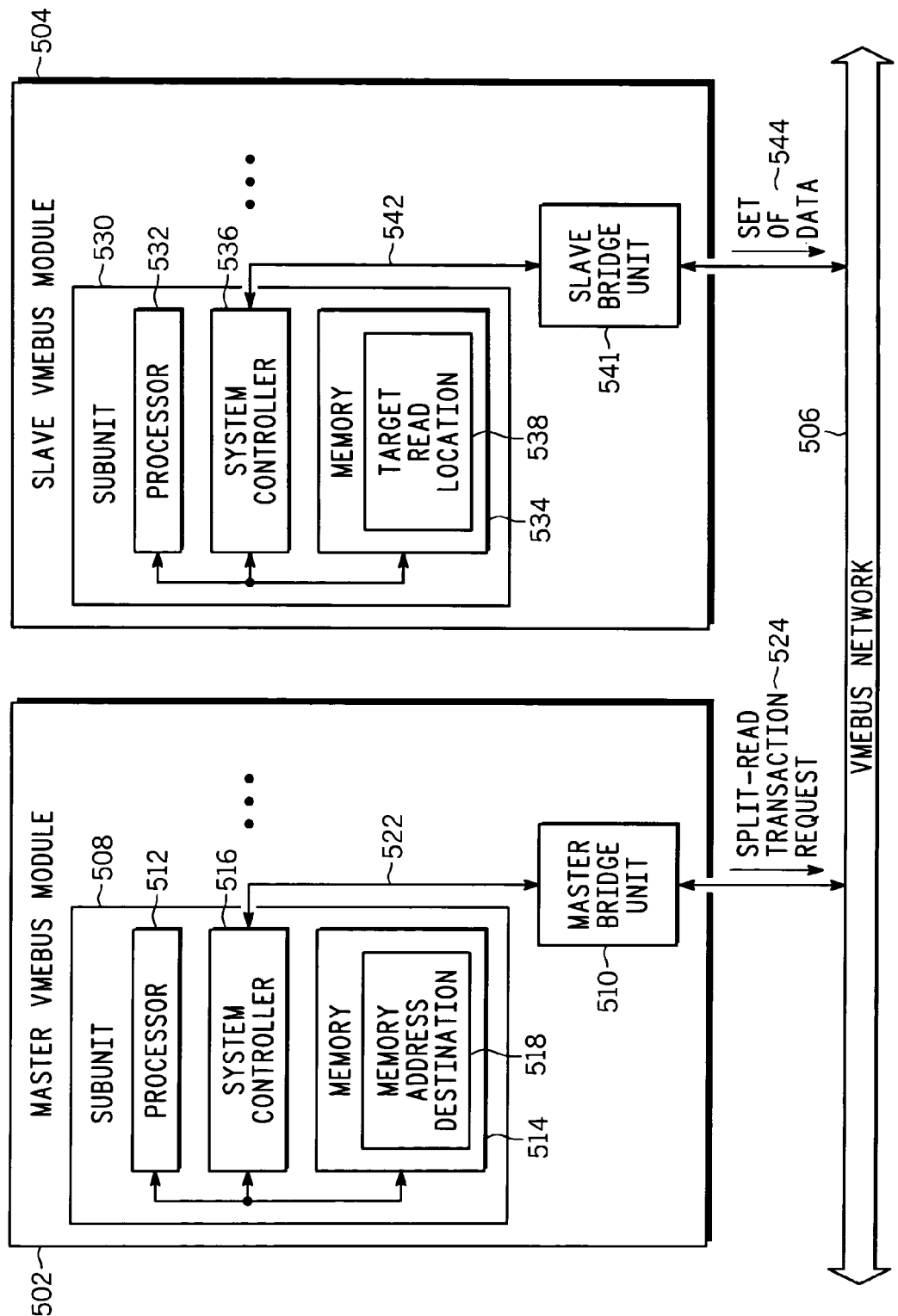
FIG. 5 depicts a multi-service platform system according to another embodiment of the invention.

FIG. 5 depicts a multi-service platform system 500 according to another embodiment of the invention. Multi-service platform system 500 can include an embedded-type computer chassis (as opposed to an enterprise based chassis), with software and any number of slots for inserting modules. In a particular embodiment, multi-service platform system 500 can include a VERSAmodule Eurocard (VME) chassis and slots for inserting VME compatible modules. VME modules can add functionality to multi-service platform system 500 through the addition of processors, memory, storage devices, and the like. A backplane can be used for connecting VME modules placed in the slots of multi-service platform system 500.

Multi-service platform system 500 can include any number of VME modules coupled to VMEbus network 506. VMEbus network 506 can include hardware and software necessary to implement a data network using VMEbus parallel multi-drop protocols. VMEbus protocols are known in the art.

As shown in FIG. 5, multi-service platform system 500 can include master VMEbus module 502 and slave VMEbus module 504. In an embodiment, VMEbus network 506 couples master VMEbus module 502 and slave VMEbus module 504. Other VMEbus modules can be included in multi-service platform system 500 and be within the scope of the invention.

Master VMEbus module 502 can include a subunit 508, where subunit includes processor 512 and memory 514. Memory 514 can comprise control algorithms, and can include, but is not limited to, random access memory (RAM), read only memory (ROM), flash memory, electrically erasable programmable ROM (EEPROM), and the like. Memory 514 can contain stored instructions, tables, data, and the like, to be utilized by processor 512. In an embodiment, subunit 508 can also include system controller 516 for controlling one or more subunits, processors, and the like, on master VMEbus module 502. System controller 516 can be a part of subunit 508 or be independent of subunit 508 and control other subunits as well. In another embodiment, master VMEbus module 502 can include more than one subunit, where other subunits can have any combination of processors, memory, and the like. In another embodiment, subunit 508 can include other elements such as data storage units (disk drives), and the like.

In an embodiment, master VMEbus module 502 can also include master VMEbus module bridge unit 510, which can be hardware and/or software to provide an interface between subunit 508 on master VMEbus module 502 and VMEbus network 506. Each subunit 508 is coupled to communicate with master VMEbus module bridge unit 510. In addition, master VMEbus module bridge unit 510 is coupled to communicate with VMEbus network 506.

In an embodiment, subunits are coupled to master VMEbus module bridge unit 510 and can communicate with master VMEbus module bridge unit 510 through a parallel multi-drop network 522, which can use for example, a Peripheral Component Interconnect-X (PCI-X) based protocol as discussed above with reference to FIG. 1.

Master VMEbus module bridge unit 510 allows master VMEbus module 502 to communicate with slave VMEbus module 504 via VMEbus network 506 using any of VMEbus based protocols cited above. In effect, master VMEbus module bridge unit 510 bridges data commands, requests, and the like, between the PCI based protocols and the VMEbus protocols.

As shown in FIG. 5, multi-service platform system 500 can include slave VMEbus module 504, which can include subunit 530 and slave VMEbus module bridge unit 541 similar to master VMEbus module 502. For example, subunit 530 can include processor 532, memory 534 and system controller 536. Subunit 530 can be coupled to slave VMEbus module bridge unit 541 and communicate using PCI or PCI-X protocols as discussed above. Slave VMEbus module bridge unit 541 can communicate with VMEbus network 506 using any of the VMEbus protocols discussed above. Slave VMEbus module 504 can include any number of subunits and be within the scope of the invention.

In an embodiment, master VMEbus module 502 can request set of data 544 from slave VMEbus module 504. Set of data 544 can include any type of electronic data that is accessible by slave VMEbus module 504. In an embodiment, master VMEbus module 502 can request set of data by issuing a VMEbus split-read transaction request 524 to slave VMEbus module 504. VMEbus split-read transaction request 524 can include a return address of master VMEbus module 502. Return address can be included in set of data 544 by slave VMEbus module 504 so that master VMEbus module 502 can recognize set of data 544 on VMEbus network 506 and retrieve set of data 544. In effect, slave VMEbus module 504 performs a write function in writing set of data 544 to master VMEbus module 502 by using the return address provided by master VMEbus module 502 in the VMEbus split-read transaction request 524. Return address can include the master VMEbus module memory address destination where set of data 544 is to be written.

Upon recognition of VMEbus split-read transaction request 524, slave VMEbus module 504 can acknowledge the VMEbus split-read transaction request 524. Thereafter, master VMEbus module 502 can release VMEbus network 506 while slave VMEbus module 504 retrieves set of data 544 from a target read location 538 in memory 534. Target read location 538 can be an address space in memory 534. In another embodiment, target read location 538 can be in an external memory source, such as a disk drive, and the like, that is accessible by slave VMEbus module 504. Master VMEbus module 502 releasing VMEbus network 506 after VMEbus split-read transaction request 524 is acknowledged frees up VMEbus network 506 for use in other VMEbus transactions by the same or different VMEbus modules in the interim until slave VMEbus module 504 acquires VMEbus network 506 to return set of data 544.

Upon retrieving set of data 544, slave VMEbus module 504 can acquire control over the VMEbus network 506 and place set of data 544 on VMEbus network 506. Set of data 144 includes return address to master VMEbus module 502 so master VMEbus module 502 can retrieve set of data 544 to master VMEbus module memory address destination 518.

FIG. 6 depicts a VME address phase encoding table 600 according to another embodiment, of the invention. As discussed above, VMEbus data transfers have two phases, a VME address encoding phase 601 and a data phase 650. In an embodiment, master VMEbus module 502 initiates the data transfer by either performing a write function and writing data to a slave VMEbus module 504 or requesting data from slave VMEbus module 504 through a read request. In an embodiment, read request can be a VMEbus split-read transaction request 524.

In VME address encoding phase 601, the target VMEbus module's address is indicated. The VMEbus protocol to be used and the transfer speed can also be indicated. In an embodiment, the target VMEbus module can be slave VMEbus module 504. As shown in FIG. 6, VME address encoding phase 601 includes three address phases. The three address phases are: address phase one 620, address phase two 630 and address phase three 640. Initiating a VMEbus split-read transaction request 524 can include transmitting all three address phases.

In an embodiment, address phase one 620 can include split-read transaction code 604 to indicate to slave VMEbus module 504 that master VMEbus module 502 is initiating a VMEbus split-read transaction request 524. In an embodiment, split-read transaction code 604 can be an XAM code. XAM in general is known in the art. Numerous codes within XAM are currently not in use in the VMEbus standard cited above. Any of these non-used XAM codes may be selected to indicate VMEbus split-read transaction request 524.

In an embodiment, XAM code used to indicate VMEbus split-read transaction request 524 can be fixed but otherwise arbitrary. In an embodiment, XAM code is known to both master VMEbus module 502 and slave VMEbus module 504. In a preferred embodiment, XAM code has a default value that is changeable through a register in a chip on VME modules. In another embodiment, XAM code indicating VMEbus split-read transaction request 524 can be fixed in a standard.

If slave VMEbus module 504 recognizes split-read transaction code 604, slave VMEbus module 504 will return an acknowledge signal to master VMEbus module 502. In an embodiment, slave VMEbus module 504 returning an acknowledge signal means that slave VMEbus module 504 is capable of performing a VMEbus split-read transaction. If an acknowledge signal is not returned to master VMEbus module 502 prior to expiration of a split-read time period, VMEbus split-read transaction request 524 expires. Failing to acknowledge VMEbus split-read transaction request 524 can mean that slave VMEbus module 504 does not recognize split-read transaction code 604 or that slave VMEbus module 504 is not capable of performing a VMEbus split-read transaction. In an embodiment, other possible responses to VMEbus split-read transaction request 524 can include the immediate sending of requested data 544 (in which case there would be no need for a VMEbus split-read transaction to take place) or a retry signal for master VMEbus module 502 to try again later.

In an embodiment, VME address encoding phase 601 can include return address 660 of master VMEbus module 502 that initiated VMEbus split-read transaction request 524. In an embodiment, return address 660 can be located in address phase three 640 of VME address phase encoding table 600. In an embodiment, return address 660 can include geographic address 663 of master VMEbus module 502, which is the slot where master VMEbus module 502 is located in multi-service platform system 500. In an embodiment, return address 660 can also include device address 665, which is the location of master VMEbus module memory address destination 518. In an embodiment, return address 660 can also include subunit 661, which is the subunit 508 on master VMEbus module 502 where master VMEbus module memory address destination 518.

In an embodiment, return address 660 is included in VMEbus split-read transaction request 524 to slave VMEbus module 504. In an embodiment, slave VMEbus module 504 places return address 660 in set of data 544 that corresponds to VMEbus split-read transaction request 524 so that set of data 544 is written back to master VMEbus module 502.

In an embodiment, length code 607 can be included in return VME phase encoding table 600 as part of VMEbus split-read transaction request 524. In an embodiment, length code 607 can be included in address phase two of VME address encoding phase 601. Length code 607 can stipulate the size of set of data 544 (in bytes or any other convenient measurement known in the art) corresponding to VMEbus split-read transaction request 524 that is to be returned to master VMEbus module 502. In an embodiment, length code 607 can stipulate the maximum size of set of data 544.

FIG. 7 depicts a ladder diagram 700 illustrating another embodiment of the invention. The process depicted in FIG. 7 illustrates an embodiment of a VMEbus split-read transaction 701. In block 702, master VMEbus module 740 acquires control over VMEbus network 506. VMEbus split-read transaction request 705 is then sent from master VMEbus module 740 to slave VMEbus module 750. VMEbus split-read transaction request 705 requests set of data 544. In an embodiment, VMEbus split-read transaction request 705 is sent in VME address encoding phase 601 and includes return address 660, including the components of return address 660 discussed with reference to FIG. 6. In an embodiment, VMEbus split-read transaction request 705 includes split-read transaction code 604, which can be an XAM code included in address phase one 620 of VME address encoding phase 601.

Upon issuance of VMEbus split-read transaction request 705, split-read timer period 703 is initiated at master VMEbus module 740. If slave VMEbus module 750 recognizes VMEbus split-read transaction request 705 issued by master VMEbus module 740, acknowledge signal 704 is sent over VMEbus network 506 to master VMEbus module 740. If slave VMEbus module 750 fails to issue acknowledge signal 704 prior to expiration of split-read timer period 703, VMEbus split-read transaction request 705 can expire. Slave VMEbus module 750 can fail to respond to VMEbus split-read transaction request 705 because split-read transaction code 604 is not supported or recognized by slave VMEbus module 750. In this instance, slave VMEbus module 750 is not capable of performing VMEbus split-read transactions. In another embodiment, slave VMEbus module 104 can respond immediately by transmitting set of data 544 requested in VMEbus split-read transaction request 705. In this instance, there is no need to perform a VMEbus split-read transaction 701 as there is no delay in acquiring set of data 544.

After master VMEbus module 740 receives acknowledge signal 704, master VMEbus module 740 releases VMEbus network 706. Releasing VMEbus network 706 while slave VMEbus module 750 retrieves set of data 710 allows other VMEbus network activity 708 to take place on VMEbus network 506. Other VMEbus network activity 708 can include any activity not related to the specific VMEbus split-read transaction 701 taking place between master VMEbus module 740 and slave VMEbus module 750. In an embodiment, other VMEbus network activity 708 can include transactions between other modules in multi-service platform system 500. In another embodiment, other VMEbus network activity 708 can include transactions between either master VMEbus module 740 or slave VMEbus module 750 and another module in multi-service platform system 500. In yet another embodiment, other VMEbus network activity 708 can include a different transaction between master VMEbus module 740 and slave VMEbus module 750. Transactions can include write function, read request, another VMEbus split-read transaction request, and the like.

Once slave VMEbus module 750 has acquired the set of data 710, slave VMEbus module 750 can acquire control of VMEbus network 712. Slave VMEbus module 750 can then write set of data 714 to master VMEbus module 740, which includes placing the set of data 544 on VMEbus network 506. Writing set of data 714 to master VMEbus module 740 can include a VME address encoding phase and data phase analogous to that shown and described in FIG. 6. In an embodiment, slave VMEbus module 750 can use return address 660 to write set of data 714 to master VMEbus module 740. The data phase can include set of data 544 requested by master VMEbus module 740.

After writing set of data 714 to master VMEbus module 740 at which time master VMEbus module 740 retrieves set of data 718, slave VMEbus module 750 can then release VMEbus network 716. In an embodiment, retrieving set of data 718 includes master VMEbus module 740 writing set of data to master VMEbus module memory address destination 518.

While we have shown and described specific embodiments of the present invention, further modifications and improvements will occur to those skilled in the art. It is therefore, to be understood that appended claims are intended to cover all such modifications and changes as fall within the true spirit and scope of the invention.

The invention claimed is:

1. A method of performing a VMEbus split-read transaction, comprising:
   providing a master VMEbus module coupled to a slave VMEbus module through a VMEbus network;
   the master VMEbus module acquiring the VMEbus network;
   the master VMEbus module initiating a VMEbus split-read transaction request to the slave VMEbus module, wherein the VMEbus split-read transaction request requests a set of data;
   the master VMEbus module releasing the VMEbus network;
   the slave VMEbus module acquiring the set of data;
   the slave VMEbus module acquiring the VMEbus network;
   the slave VMEbus module transferring the set of data to the master VMEbus module; and
   the slave VMEbus module releasing the VMEbus network.

2. The method of claim 1, further comprising the slave VMEbus module acknowledging the VMEbus split-read transaction request.

3. The method of claim 1, wherein initiating the VMEbus split-read transaction request comprises providing a split-read transaction code to the slave VMEbus module.

4. The method of claim 3, wherein the split-read transaction code is an XAM code.

5. The method of claim 3, wherein the split-read transaction code is known by both the master VMEbus module and the slave VMEbus module.

6. The method of claim 1, wherein initiating the VMEbus split-read transaction request initiates a split-read timer period at the master VMEbus module.

7. The method of claim 6, wherein if the slave VMEbus module fails to acknowledge the VMEbus split-read transaction request prior to expiration of the split-read timer period, the VMEbus split-read transaction request expires.

8. The method of claim 1, further comprising after the master VMEbus module releasing the VMEbus network, the VMEbus network performing other VMEbus network activity prior to the slave VMEbus module acquiring the VMEbus network.

9. A method of performing a VMEbus split-read transaction, comprising:
   providing a master VMEbus module coupled to a slave VMEbus module through a VMEbus network;
   the master VMEbus module initiating a VMEbus split-read transaction request in a VME address encoding phase to the slave VMEbus module, wherein the VMEbus split-read transaction request comprises a tag identifier in the VME address encoding phase corresponding to the VMEbus split-read transaction request, wherein the tag identifier is unique to the VMEbus split-read transaction request, and wherein the VMEbus split-read transaction request requests a set of data;
   the master VMEbus module releasing the VMEbus network;
   the slave VMEbus module acquiring the VMEbus network;
   the slave VMEbus module placing the set of data on the VMEbus network, wherein the set of data comprises the tag identifier;
   the master VMEbus module correlating the tag identifier to the split-read transaction request; and
   the master VMEbus module retrieving the set of data.

10. The method of claim 9, further comprising the slave VMEbus module acknowledging the VMEbus split-read transaction request.

11. The method of claim 9, wherein initiating the VMEbus split-read transaction request comprises providing a split-read transaction code to the slave VMEbus module.

12. The method of claim 11, wherein the split-read transaction code is a first XAM code.

13. The method of claim 9, wherein the slave VMEbus module placing the set of data on the VMEbus network comprises the slave VMEbus module placing the set of data on the VMEbus network with a respond code.

14. The method of claim 13, wherein the respond code comprises a second XAM code.

15. The method of claim 9, further comprising after the master VMEbus module releasing the VMEbus network, the VMEbus network performing other VMEbus network activity prior to the slave VMEbus module acquiring the VMEbus network.

16. The method of claim 9, wherein correlating the tag identifier comprises correlating the tag identifier with a master VMEbus module memory address destination.

17. The method of claim 16, wherein the master VMEbus module retrieving the set of data comprises the master VMEbus module writing the set of data to the master VMEbus module memory address destination.

18. The method of claim 16, wherein correlating the tag identifier comprises looking up the tag identifier in a tag identifier table in a master VMEbus module bridge unit.

19. The method of claim 9, wherein the tag identifier is included in an address phase two of the VME address encoding phase.

20. The method of claim 9, wherein initiating the VMEbus split-read transaction request initiates a split-read timer period at the master VMEbus module.

21. The method of claim 20, wherein if the slave VMEbus module fails to acknowledge the VMEbus split-read transaction request prior to expiration of the split-read timer period, the VMEbus split-read transaction request expires.

* * * * *